United States Patent [19]

Rebours et al.

[11] 4,230,468
[45] Oct. 28, 1980

[54] DUST SEPARATOR WITH DECLOGGING DEVICE

[75] Inventors: Albert Rebours, Chatou; Jean-Pierre Guibet, Vernon, both of France

[73] Assignee: Air Industrie, Courbevoie, France

[21] Appl. No.: 908,928

[22] Filed: May 24, 1978

[30] Foreign Application Priority Data

May 26, 1977 [FR] France ............................ 77 16149

[51] Int. Cl.³ ............................................ B01D 46/04
[52] U.S. Cl. ......................................... 55/294; 55/287; 55/288; 55/302; 55/341 R
[58] Field of Search .................. 55/287, 288, 293, 294, 55/302, 341 R, 341 MC

[56] References Cited
U.S. PATENT DOCUMENTS 2,980,207  4/1961  Allen ................................. 55/302 X

FOREIGN PATENT DOCUMENTS 649123  9/1962  Canada ......................................... 55/302

Primary Examiner—Kathleen J. Prunner
Attorney, Agent, or Firm—Daniel M. Rosen

[57] ABSTRACT

A dust separator which has an inlet enclosure having an inlet for dust-laden gas, an outlet enclosure having side walls and connected to a pipe for discharging the dust-freed gas, a separating wall separating the inlet and outlet enclosures, several elongated filtering elements disposed in the inlet enclosure, each element having a longitudinal axis and an opening at the end emerging into the outlet enclosure, and at least one nozzle having an orifice which has an axis for blowing counter flow declogging gas into the outlet enclosure and into the filtering elements. The axis of the nozzle orifice is directed transversely to the axes of the filtering elements and obliquely to the surface of one of the side walls of the outlet enclosure.

6 Claims, 1 Drawing Figure

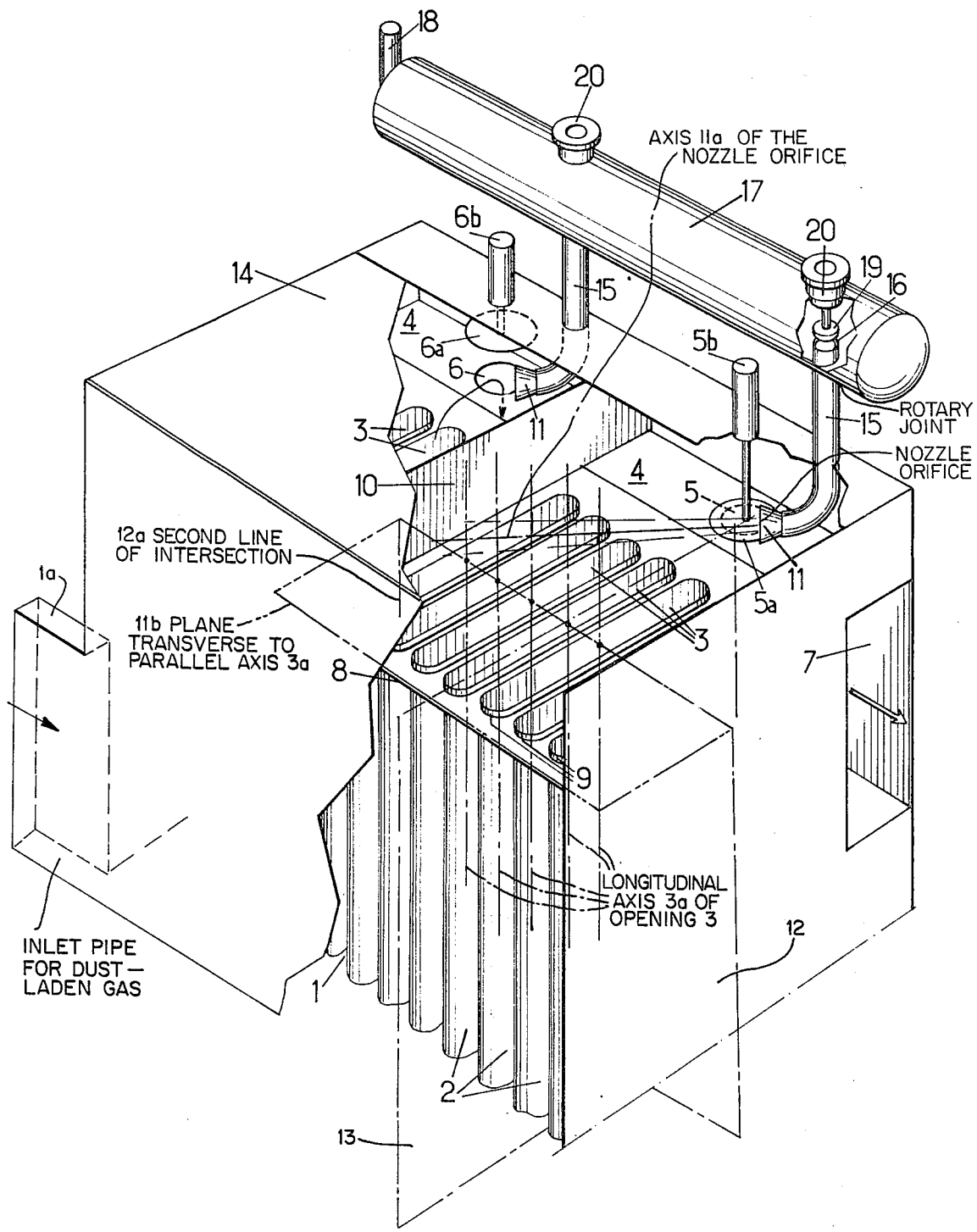

DUST SEPARATOR WITH DECLOGGING DEVICE

This invention relates to a dust separator, of the type having at least one inlet enclosure connected to a pipe for introducing dust-laden gas and at least one outlet enclosure comprising side walls and connected to a pipe for discharging the dust-freed gas, with the outlet enclosure separated from the inlet enclosure by a separating wall. Several elongated filtering elements are disposed in parallel relationship in the inlet enclosure, each opening of these elements emerging, by passing through the separating wall, into the outlet enclosure. There is at least one nozzle, oriented transversely to said openings, for blowing counter-flow compressed declogging gas directly into the outlet enclosure, this nozzle being associated with feeding means for connecting it, at given times, to a source of compressed gas.

It will be appreciated that the filter elements in question may be formed, in a way known per se, by conventional filtering pockets or sleeves, for example with filter walls made from a woven material.

It will also be appreciated, from what has gone before, that the gas to be filtered passes through the walls of these elements from the outside to the inside (the dust thus being deposited on the outer faces of the elements), and the counter-flow declogging gas (compressed air) from the inside to the outside, which suddenly inflating the pockets or sleeves, lossens the dust therefrom while passing through the walls in counter-current fashion, the dust being collected in a discharge hopper.

The declogging phases are sequential and this is why the nozzle(s) for blowing the declogging gas are associated with means for connecting them at given times to a source of compressed gas, the communication between the outlet enclosure and said discharge pipe being able, moreover, to be interrupted at that time.

In such devices there arises the problem of the efficiency of the declogging whose general operation has just been recalled.

It has been thought up to now that it was preferable to dispose the nozzle for blowing the declogging gas (or nozzles) so that the axis of its outlet is in the same direction as that of the central longitudinal axes of the filtering elements so that the efficiency of the jet of declogging gas is the highest. In fact, it has been found in use that such is not the case and that a sufficient homogeneity of the declogging cannot be obtained in this way, because of the existence of marked preferential effects on certain of the elements. This is normally remedied by disposing a deflector or screen between the outlet of the nozzle and the outlets of the elements, but this deflector appreciably attenuates the force of the jet of declogging gas and prevents its effect from being felt sufficiently fiercely at the filtering walls of the elements; moreover, there is a "dead zone" just below the deflector and again the desired homogeneity cannot be obtained.

The essential aim of the invention is to remedy all these disadvantages, and for this there is provided, contrary to what has been done up to now, that the axis of the orifice of said blowing nozzle is directed essentially transversely to the central longitudinal parallel axes of the filtering elements and obliquely in relation to the surface of one of said side walls of the outlet enclosure.

The effect of this arrangement is that there is then obtained an extremely efficient declogging of the filtering elements, sufficiently homogenous and fierce. The gas jet, being directed essentially transversely to the openings of the filtering elements, will be inevitably reflected obliquely by at least one of the walls of said outlet enclosure, which will allow it to be distributed uniformly in all the openings of the filtering elements without the fierceness of its effects being attenuated.

So as to obtain again more reliably a uniform distribution of the effects of the declogging gas, moreover, it may be arranged for the nozzle to be orientated so that its axis is directed obliquely to the surface of one of the side walls of the outlet enclosure. This surface then forms a deflector for the declogging gas jet, but in a plane essentially transverse (possibly perpendicular) to the openings of the filtering elements.

Moreover, in the case—frequent—where the said elongated filtering elements are juxtaposed in an arrangement having two planes of symmetry perpendicular to the plane of said separating wall and one of which is substantially perpendicular to said side wall, it may be advantageously arranged that the nozzle is orientated so that the axis of its orifice meets obliquely said side wall at least approximately along the line of intersection between it and said plane of symmetry which is perpendicular thereto.

Also with the aim of avoiding any preferential effect of the declogging gas on certain filtering elements, and the appearance of zones in which the declogging is less efficient, it may also be arranged that the orifice of said nozzle is staggered in relation to the other of said planes of symmetry.

Generally, it will also be very advantageous for said declogging gas blowing nozzle to be set back in relation to the openings of the filtering elements. In other words, the nozzle is not placed above the openings of the filtering elements, here again contrary to the usual arrangement. This precaution has moreover the advantage of allowing the cover plate for the outlet enclosure to be freed from any subservience in connection with the blowing nozzle(s), for in known devices on the contrary this cover must support the nozzles, which causes appreciable complications.

Finally, to ensure that the nozzle provides inside the outlet enclosure a fierce declogging jet, it is also advantageous for the means for feeding the blowing nozzle with declogging gas to comprise a valve shut-off disposed in a pressurized gas reservoir.

Thus is obtained the most direct feed possible of the pressurized declogging gas to the outlet orifice of the nozzle. Of course, this reservoir, for example cylindrical in shape may contain several valve shut-offs for the successive feeding of several declogging nozzles, in the case of a filtration installation comprising several devices of the above described kind, i.e. several filtration cells. The valves, spherical or hemi-spherical in shape for example, may advantageously be controlled sequentially by pneumatic jacks, in a way known per se.

An embodiment of the invention is described below by way of an example which is in no way limiting, with reference to the single FIGURE of the accompanying drawing, which represents partially a device according to the invention, in perspective with parts cut away.

The device shown by way of example in the single FIGURE of the accompanying drawing comprises an inlet enclosure 1 connected to a pipe 1a for introducing the gas from which the dust is to be removed. This enclosure 1 contains an assembly of filtering elements 2 (shown in the form of pockets, with filtering walls made for example from a woven material), disposed parallel to each other, while being slightly spaced apart so that the gas to be filtered reaches the whole of the surface of the side walls. Openings 3 of these elements, through which the dust-freed gas leaves, emerge into an outlet enclosure 4 adapted to communicate through closable openings such as 5 and 6 with a pipe 7 for discharging the clean gas. The inlet enclosure 1 and outlet enclosure 4 are separated by a separating wall 8 provided with passages through which pass the rigid collars 9 of the openings 3 of the elements.

The device shown in the FIGURE is formed from two assemblies of juxtaposed cells, but it is evident that it could comprise a greater number thereof. In any case, outlet enclosure 4 comprises separating walls such as 10, so that the declogging operation may be sequentially effected cell by cell. This is why, since the declogging operations must take place with closing of the passage for communicating the discharge pipe for clean gas 7 with openings 3 of the filtering elements of the corresponding cell, it is provided that these passages (openings 5 and 6) have independent closing means, e.g. of the "cymbal" type, respectively 5a and 6a, adapted to be controlled by any known means, e.g. by pneumatic jacks, respectively 5b and 6b.

In the FIGURE opening 5 is shown closed, the corresponding cell being declogged, whereas opening 6 provides a passage for communicating openings 3 of the elements of the other cell with discharge pipe 7.

This being so, the invention concerns essentially the pneumatic declogging means, and more especially the particular arrangement of the nozzles for blowing the pressurized counter-flow declogging gas (compressed air).

Referring for example to that of the two cells which is being declogged (the declogging nozzle of the other cell being similarly disposed), the corresponding nozzle referenced at 11, whose orifice may have the shape of a diffuser nozzle, is orientated so that the axis 11a of this orifice is directed in a plane 11b disposed transversely (as a rule perpendicularly) to the lines 3a, defining central longitudinal axes of the filtering elements 2.

Furthermore, this nozzle is orientated so that the axis 11a of its orifice meets obliquely the separating wall 10 adjacent the part thereof which is located at least approximately in the mean plane 12 of the alignment of openings 3; in other words, since the filter elements are juxtaposed in an arrangement presenting two perpendicular planes of symmetry 12 and 13, it is arranged that the axis 11a of the orifice of blowing nozzle 11 meets obliquely the separating wall 10 approximately on the line 12a along which the plane of symmetry 12 meets said wall.

Moreover, it is provided, on the one hand, that nozzle 11 is staggered or oblique in relation to the other plane of symmetry 13, i.e. that it is located outside this plane and, on the other hand, that it is set back in relation to the openings 3 of the filtering elements, i.e. that it is not located above these openings.

This latter arrangement, besides the advantages already mentioned above, eliminates any subservience for the cover plate(s) 14 of outlet enclosure 4 which, in previously known devices, had to serve as supports for the blowing nozzles.

Finally, the invention further relates to the means for feeding the blowing nozzles 11 with declogging gas.

So as to obtain an extremely rapid pressure rise in the part of the outlet enclosure 4 which is subjected to a declogging operation, it is essentially arranged that the nozzles such as 11 are connected to feed pipes such as 15 whose other ends 16, advantageously having a convergent shape, emerge into a common pressurized gas reservoir 17, fed by a pipe 18, these ends 16 serving as seats for closing valves such as 19.

These closing valves are also provided so as to be controlled individually, e.g. by means of pneumatic jacks such as 20 and, in a way known per se, they may advantageously have a spherical or hemi-spherical shape.

Thus, as soon as the corresponding jack 20 is actuated, the lifting of the associated closing valve 19 allows immediately a very rapid pressure rise in pipe 15 and, consequently, a sufficiently fierce declogging effect on the outer walls of filtering elements 2.

Of course, when a jack 20 is actuated to cause the opening of the corresponding valve, the control of jack 5b or 6b of the cell concerned is such that the corresponding opening (5 or 6) is closed.

Preferably, it will furthermore be provided that the opening (5 or 6) for communicating discharge pipe 7 with the corresponding part of the outlet enclosure 4 will further remain closed for a few moments after the emission of the declogging gas, so as to facilitate the fall into the hopper (not shown, situated at the base of the device) of the dust which is loosened from the outer walls of the filtering elements.

As is evident, and as it follows moreover already from what has gone before, the invention is in no way limited to those of its modes of application and embodiments which have been more especially considered; it embraces, on the contrary, all variations thereof.

For example, it is understood that any means whatever could be used for adjusting the inclination of the orifice, axes of the blowing nozzles 11 in relation to separating wall 10, to obtain an optimum declogging effect, this depending on the shape and/or the size of the outlet enclosure 4; there could for example, for this purpose, be provided pipes 15 mounted on reservoir 17 by means of rotary joints.

We claim:

1. In a dust separator apparatus operable with a source of compressed declogging gas, and including an inlet enclosure with means for introducing dust-laden gas into said inlet enclosure, an outlet enclosure including side walls thereof with means for discharging dust-freed gas therefrom, a separating wall for separating said inlet and outlet enclosures from each other, and a plurality of elongated filter elements disposed in the inlet enclosure, these elements having central longitudinal axes respectively in parallel relationship, each filter element having one end thereof traversing said separating wall with an opening in said end of each filter element communicating into said outlet enclosure, the apparatus further comprising duct means for selectively introducing compressed gas from said source thereof into said outlet enclosure to flow into said filter elements in counter-flow relative to the flow of dust-freed gas therethrough, said duct means comprising at least one nozzle having a discharge end terminating as an orifice with a discharge axis thereof directed essentially transversely to said parallel axes of said filter elements and across said open ends thereof and directed obliquely to at least one of said side walls of said outlet enclosure in the vicinity of said open ends of said filter elements.

2. A dust separator according to claim 1 wherein said filter elements have their open ends situated generally along a plane transverse to said parallel axes thereof, with intersecting and mutually perpendicular 1st and 2nd planes of symmetry being definable through each of said filter elements when a 1st line of intersection between these intersecting planes is coincident with the central longitudinal axis therethrough, and wherein at least the first of said planes of symmetry is generally perpendicular to said one of said side walls of the outlet enclosure and defines a 2nd line of intersection therewith in the general vicinity of said filter element openings, and said nozzle axis is oriented obliquely relative to said side wall at said 2nd line of intersection.

3. A dust separator according to claim 2 wherein said orifice of the nozzle is oriented obliquely relative to the second of said planes of symmetry.

4. A dust separator according to claim 2 wherein said nozzle orifice is laterally spaced apart from said openings of said filter elements.

5. A dust separator operable with a source of compressed de-clogging gas, for filtering dust-laden gas into dust-freed gas, comprising at least one inlet enclosure connected to a pipe for introducing the dust-laden gas, at least one outlet enclosure comprising side walls and connected to a pipe for discharging dust-freed gas, said outlet enclosure being separated from the inlet enclosure by a separating wall, several elongated filter elements each having an opening, said elements having longitudinal axes disposed in parallel relationship in the inlet enclosure, each opening of said elements emerging, by passing through said separating wall, into the outlet enclosure, and at least one nozzle, the orifice of which has an axis, for blowing counter-flow declogging gas emerging into the outlet enclosure, said nozzle being selectively connectible with feeding means to said source of compressed gas, the axis of the orifice of said nozzle being directed essentially transversely to the openings of the filter elements and parallel axes of said filter elements so as to direct the declogging gas to impinge obliquely on the surface of one of the said side walls of said outlet enclosure, said feeding means comprising a valve associated with said source of pressurized gas.

6. A dust separator operable with a source of compressed de-clogging gas, for filtering dust-laden gas into dust-freed gas, comprising at least one inlet enclosure connected to a pipe for introducing the dust-laden gas, at least one outlet enclosure comprising side walls and connected to a pipe for discharging dust-freed gas, said outlet enclosure being separated from the inlet enclosure by a separating wall, several elongated filter elements each having an opening, said elements having longitudinal axes disposed in parallel relationship in the inlet enclosure, each opening of said elements emerging, by passing through said separating wall, into the outlet enclosure, and at least one nozzle, the orifice of which has an axis, for blowing counter-flow declogging gas emerging into the outlet enclosure, said nozzle being selectively connectible with feeding means to said source of compressed gas, the axis of the orifice of said nozzle being directed essentially transversely to the openings of the filter elements and parallel axes of said filter elements so as to direct the declogging gas to impinge obliquely on the surface of one of the said side walls of said outlet enclosure, the dust separator further comprising means for adjusting the orientation of the orifice axis of said nozzle relative to the shape and/or size of the outlet enclosure.

* * * * *